United States Patent [19]

Takiyama et al.

[11] 4,134,884

[45] Jan. 16, 1979

[54] CURABLE RESINOUS COMPOSITION COMPRISING UNSATURATED ALKYD AND UNSATURATED CYCLOACETAL

[75] Inventors: Eiichiro Takiyama, Kamakura; Yasuji Komatsu, Hoya; Hiroshi Danbara, Takasaki, all of Japan

[73] Assignee: Showa Highpolymer Co., Ltd., Tokyo, Japan

[21] Appl. No.: 757,283

[22] Filed: Dec. 22, 1976

[30] Foreign Application Priority Data

Dec. 29, 1975 [JP] Japan .................................. 51-156038

[51] Int. Cl.$^2$ ............................................. C08L 67/06
[52] U.S. Cl. ...................................................... 260/861
[58] Field of Search ........................................ 260/861

[56] References Cited

U.S. PATENT DOCUMENTS

| 3,209,054 | 9/1965 | Englisch et al. | 260/861 |
| 3,247,282 | 4/1966 | Englisch et al. | 260/861 |
| 3,373,160 | 3/1968 | Ikeda | 260/860 |
| 3,823,201 | 7/1974 | Pizzini et al. | 260/861 |
| 3,893,985 | 7/1975 | Papa et al. | 526/266 |

Primary Examiner—Hosea E. Taylor
Assistant Examiner—Amelia B. Yarbrough
Attorney, Agent, or Firm—Wenderoth, Lind & Ponack

[57] ABSTRACT

This invention relates to a curable resinous composition which comprises (I) 100 parts by weight of unsaturated alkyd obtained by the condensation reaction of an α,β-unsaturated polycarboxylic acid or its anhydride with polyhydric alcohol or alkylene oxide and (II) 1 - 200 parts by weight of an unsaturated cycloacetal obtained by the condensation reaction of an unsaturated aldehyde with a polyhydric alcohol.

7 Claims, No Drawings

CURABLE RESINOUS COMPOSITION COMPRISING UNSATURATED ALKYD AND UNSATURATED CYCLOACETAL

DETAILED EXPLANATION OF INVENTION

This invention relates to a curable resinous composition which can be used in the form of granules or powder.

Various thermosetting resins such as urea resin, phenolic resin, melamine resin, epoxy resin, diallylphthalate resin and the like are presently used as molding compound. It is well known that these resins have individual characteristics and are used for various applications depending on their properties. Although the properties of these resins have been improved year by year, they are often still unsatisfactory in the light of properties and cost. For example, phenolic resin is cheap but unsatisfactory in view of arc resistance and anti-tracking properties. It is very difficult to prepare a molding material which is cheap and has satisfactory insulation properties.

For the first stage, we have found that a resin obtained by using an unsaturated alkyd having a high melting point together with a monomer having a high boiling point such as diallylphthalate has more preferable properties than the conventional resins. However, molding compound prepared by using the resin obtained by this method sometimes produces cracks during molding process although it provides excellent electric properties. In addition to this defect, the molding material thus obtained sometimes causes "blocking" in summer. These defects render this resin sometimes useless for practical use.

As a result of research on an improved molding compound comprising unsaturated alkyd as a main component, it has been noted that it is very difficult to achieve desired moldability and storage stability by using a monomer which is liquid at room temperature and which provides a rigid and brittle resin after cure. Consequently, a cross-linking agent which is solid at room temperature and which does not provide cracks during the molding process has been required.

Under these circumstances, we have found that an unsaturated cycloacetal compound produced by a condensation reaction of unsaturated aldehyde with polyhydric alcohol is an effective cross linking agent for unsaturated alkyd. "Unsaturated cycloacetal compound" used in this invention refers to the condensation product of unsaturated aldehyde with polyhydric alcohol having 3 or more hydroxyl groups. A typical example is diallylidene pentaerythritol which is synthesized from acrolein and pentaerythritol in the following manner:

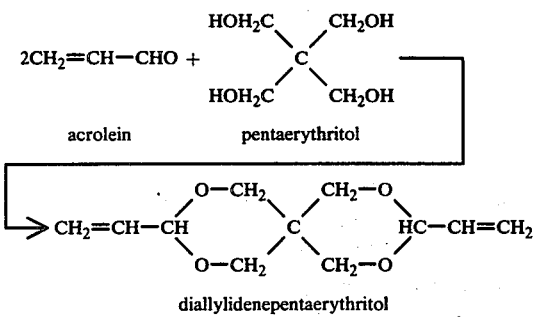

Generally, this type of cycloacetal compound is reported to be poor in respect to radical polymerizability.

Thus, according to the conventional viewpoint, it was considered to be difficult to employ an unsaturated cycloacetal compound as a polymerizable or crosslinking monomer.

However, contrary to this conventional view, we have found the unsaturated cycloacetal compound becomes a very useful crosslinking agent in the presence of a polymerization catalyst at a predetermined temperature when it is used in combination with unsaturated alkyd.

The conventional monomers which are solid at room temperature include acrylamide, diacetone acrylamide and the like, but these monomers are water-soluble and do not provide satisfactory properties after curing.

It is known that unsaturated alkyd provides desirable properties, but in order to use the unsaturated alkyd as a granular or powdery molding compound or powder-coating resin, it has been necessary to use specially prepared unsaturated alkyd having a high melting point of 90° C. or above with a minor amount of liquid monomer or powdery resin such as diallyl phthalate prepolymer copolymerizable with unsaturated alkyd as a crosslinking agent. In the case of using rigid high molecular reactive resin, there are problems that the molded product produces cracks and does not have satisfactory mechanical strength since the resin employed is brittle. Besides, this resin is used in substantially the same amount as unsaturated alkyd and accordingly it is not desirable in the light of ecconomical view point.

However, in the case of using an unsaturated cycloacetal compound, particularly diallylidene pentaerythritol which is a crystal having a melting point of 42°–43° C., it is not necessary to use unsaturated alkyd having a specially high melting point, but unsaturated alkyd having a melting point in the range of 50° to 120° C. which is commonly used can be used. Thus, particulate or powdery molding material which is not sticky at room temperature can be obtained.

"Unsaturated alkyd" used in this invention refers to the esterification reaction product of an α,β-unsaturated polycarboxylic acid or its anhydride with polyhydric alcohol or alkylene oxide, and the α,β-unsaturated polycarboxylic acid or its anhydride may optionally be modified with saturated polycarboxylic acid or its anhydride.

Examples of the α,β-unsaturated polycarboxylic acid or its anhydride used to prepare the unsaturated alkyd include maleic anhydride, maleic acid, fumaric acid, itaconic acid, itaconic anhydride and the like.

Examples of saturated polycarboxylic acid and its anhydride used to modify the α,β-unsaturated polycarboxylic acid or its anhydride include phthalic anhydride, isophthalic acid, terephthalic acid and its ester, succinic acid, adipic acid, azelaic acid, sebacic acid, hexahydrophthalic anhydride, tetrachlorophthalic anhydride, tetrabromophthalic anhydride, trimellitic anhydride, pyromellitic anhydride and the like. In addition to the above saturated polycarboxylic acid, tetrahydrophthalic anhydride, endomethylenetetrahydrophthalic anhydride and chlorendic acid can also be used as starting material to prepare unsaturated polyester resin. Strictly speaking, these acids are not "saturated", but their unsaturated bonds are inactive in respect to polymerizability and are used as "saturated" acids. These acids may be used in combination.

With regard to polyhydric alcohols to be esterified with the above mentioned polycarboxylic acids, glycols are generally preferable, but polyhydric alcohols having 3 or more hydroxyl groups may also be used if desired. Examples of the polyhydric alcohols include ethylene glycol, propylene glycol, 1,3-butanediol, 1,4-butanediol, neopentyl glycol, 2,2,4-trimethylpentanediol-1,3, 1,6-hexanediol, dibromoneopentyl glycol, hydrogenated bisphenol A, the addition product of bisphenol A with propylene oxide or ethylene oxide, diethylene glycol, dipropylene glycol, 1,2,3-trihydroxypropane, trimethylolpropane, pentaerythritol and the like.

The unsaturated alkyd thus obtained should preferably have a melting point in the range of 50°-120° C. If the melting point is lower than this range, it is difficult to obtain powdery molding materials, and on the contrary if the melting point is higher than this range, moldability becomes poor. In place of the above mentioned polyhydric alcohols, their corresponding alkylene oxides can also be used in the reaction with the above mentioned polycarboxylic acid anhydrides to prepare unsaturated alkyds in accordance with this invention.

"Unsaturated cycloacetal compound" used in the resinous composition of this invention includes polyacrolein acetals, polycrotonaldehyde acetals and the like, particularly diallyldiene pentaerythritol, triallylidene sorbitol, monoallylidene trimethylolpropane and monoallylidene trimethylolethane.

These unsaturated cycloacetals can be obtained by reacting polyhydric alcohol with unsaturated aldehyde in the presence of an acid catalyst. This reaction is fully described in "Angewandte Chemie" (Vol. 62, No. 5, pp. 105-118, 1950). However, among these acetals, a polyacrolein acetal is preferable in order to obtain the desired product having a light color, and this compound substantially suffices for most of the purpose.

Unsaturated cycloacetal used as a crosslinking agent should preferably having 2 or more unsaturated bonds. However, hydroxy unsaturated dioxolane having one unsaturated bond only which is the condensation product of acrolein with trihydric alcohol can practically be used by modifying a hydroxyl group with diisocyanate in the following manner:

material, powder coating material, prepreg material and the like.

The resinous composition of this invention may optionally include thermoplastic polymers, curing catalysts, organic or inorganic reinforcement material, fillers, pigments, releasing agents, stabilizers and the like.

Thermoplastic polymers used in this invention include polyethylene and its copolymer, polystyrene and its copolymer, polyvinylmethylether, polyvinyl acetate, copolymer of vinyl chloride with other monomers, polymethacrylates, polyacrylates, coumarone-indene resin, ketone resin, petroleum resin, polyethylene-terephthalate-isophthalate polyester, polyvinyl acetal, polyvinyl butyral and the like.

Curing catalysts used in this invention include bis(4-t-butyl cyclohexyl)peroxy-dicarbonate, benzoyl peroxide, t-butyl perbenzoate, t-butyl hydroperoxide, dicumyl peroxide, 2,5-dimethyl-2,5-di-(t-butyl peroxy)hexane, 1,1-di-t-butyl peroxy-3,3,5-trimethyl cyclohexane and the like.

Reinforcement material used in this invention includes glass fiber, polyvinyl alcohol (Vinylon), polyesters, acrylic resin, carbon fiber and the like.

Fillers used in this invention include calcium carbonate, clay, alumina, silica, aluminium silicate, calcium silicate, magnesium carbonate, asbestos, mica, powdered walnut and the like.

Releasing agents used in this invention include metallic soap, waxes having high softening point (80° C. or more) and the like.

Stabilizers used in this invention include polyhydric phenols, quinones and the like.

This invention is illustrated by the following Examples.

EXAMPLE 1

Preparation of Unsaturated Alkyd (A)

875 g of neopentyl glycol and 988 g of fumaric acid were charged in a two liter four-necked flask equipped with a stirrer, reflux condenser, thermometer and inlet tube for inert gas. The mixture was esterified at 190°-210° C. in an inert gas stream until the acid value became 20 or less. Then, 0.3 g of hydroquinone was

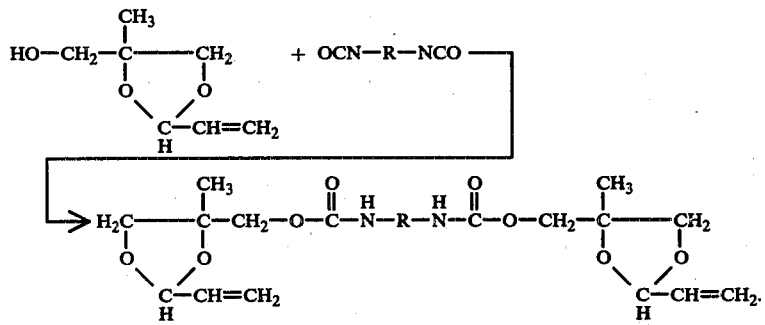

The blending ratio of unsaturated alkyd and unsaturated cycloacetal compound in the resinous composition of this invention varies depending of uses, but the unsaturated cycloacetal compound is generally used in an amount of 1-200, preferably 1-100, most preferably 5-50 parts by weight per 100 parts by weight of the unsaturated alkyd.

The mixture of unsaturated alkyd and unsaturated cycloacetal of this invention can be used in the form of granules or powder, and is therefore suitable as molding added to the reaction mixture and the mixture was placed on a stainless steel tray. If this mixture is subjected to rapid cooling, it becomes a viscous resin, but when the mixture was allowed to stand at 50°-60° C. for 3-7 days, it became a crystallized white wax-like product having a melting point of about 110° C. Thus, unsaturated alkyd resin (A) was obtained.

Preparation of Molding Compound (B)

Components as disclosed in the following Table 1 were kneaded with rollers at 110°-115° C. and the mixture was cooled to obtain a product which was easily reduced to powder. The powdered product was not sticky at all.

Table 1

|  | parts by weight |
|---|---|
| unsaturated alkyd (A) | 100 |
| diallylidenepentaerythritol | 20 |
| calcium carbonate | 250 |
| hydrated alumina | 150 |
| ¼" glass fiber | 30 |
| zinc white (zinc oxide) | 1 |
| dicumyl peroxide | 3 |
| black pigment | 3 |
| zinc stearate | 4 |

This powdered product was passed through a 40 mesh shieve and press-molded at 170°-180° C. under a pressure of 100 kg/cm² for 1 minute per 1 mm thickness. The molded product thus obtained was measured with regard to various physical properties and the results are shown in the following Table 2. It is clear from these results that the resin of this invention is excellent as a molding material with regard to heat deformation temperature and anti-tracking properties, particularly heat distortion temperature.

Table 2

| bending strength (kg/mm²) | 8.4 – 10.7 |
|---|---|
| Charpy impact strength (kg-cm/cm²) | 3.4 – 3.9 |
| heat distortion temperature (° C) | 247 |
| normal insulation resistance by JIS Method (ohm) | $10^{15}$ |
| insulation resistance after two hours boiling (ohm) | $10^{13}$ |
| arc resistance (second) | 184 |
| anti-tracking properties (IEC Method CTI) | 600V, 51 drops or more |
| fire retardance (UL Method) | 94V-O pass |

A molded product obtained by using a resinous composition comprising the same components disclosed in the above Table 1 except for omitting diallylidene pentaerythritol formed cracks.

EXAMPLE 2

Preparation of Unsaturated Alkyd (C)

670 g of propylene glycol and 830 g of isophthalic acid were charged in a two liter four-necked flask equipped with a stirrer, reflux condenser, thermometer and inlet tube for gas. The mixture was esterified at 180°-190° C. in an inert gas stream until the acid value became 30 or less. After adding 490 g of maleic anhydride to the reaction mixture, the esterification reaction was continued at 210°-220° C. and the reaction mixture was vacuum-treated at 5-7 mm Hg and at an acid value of 50 or less for 1 hour. The reaction was stopped at an acid value of 30 or less. Then, 0.3 g of hydroquinone was added to ʻ.e reaction mixture and the mixture was placed on a stainless steel tray to cool.

The unsaturated alkyl (C) was transparent yellowish brown resin having a melting point of 80°-85° C.

Preparation of Molding Compound (D)

Components as disclosed in the following Table 3 were kneaded in a kneading mixer heated to 90°-105° C. and the kneaded product was extruded by an extruder to obtain a particulate molding material (D) having a particle size of 4-4.5 mm in diameter.

Table 3

|  | parts by weight |
|---|---|
| unsaturated alkyd (C) | 100 |
| diallylidenepentaerythritol | 20 |
| calcium carbonate | 300 |
| hydrated alumina | 150 |
| powdered polyethylene | 5 |
| hexabromobenzene | 10 |
| antimony trioxide | 5 |
| dicumyl peroxide | 4 |
| zinc stearate | 5 |
| ¼" glass fiber | 30 |
| pigment (black) | 5 |

This particulate molding material (D) was injection-molded into a test piece at 170°-180° C. by an injection molding machine for thermosetting resin. The molded product thus obtained was measured with regard to physical properties and the results are shown in the following Table 4. It is clear from these results that the resin of this invention is excellent as a molding material.

Table 4

| bending strength (kg/mm²) | 9.8 – 11.4 |
|---|---|
| Charpy impact strength (kg-cm/cm²) | 4.4 – 6.2 |
| heat distortion temperature (° C) | 141.5 |
| insulation resistance (ohm) | $10^{15}$ |
| insulation resistance after two hours boiling (ohm) | $10^{14}$ |
| arc resistance (second) | 182 |
| anti-tracking properties (IEC Method CTI) | 600V, 51 drops or more |
| fire retardance (UL Method) | 94V-O pass |

A molding material comprising the same components disclosed in the above Table 3, except for omitting diallylidene pentaerythritol was poor in flow properties, and was impossible to injection-mold.

EXAMPLE 3

Preparation of Unsaturated Alkyd (E)

770 g of 1,6-hexane diol and 498 g of isophthalic acid were charged in a two liter four-necked flask equipped with a stirrer, thermometer, inlet tube for gas and reflux condenser. The mixture was esterified at 230°-240° C. in an inert gas stream to dissolve the isophthalic acid until the acid value became 30 or less. Then, 812 g of fumaric acid was added to the reaction mixture and the esterification reaction was continued at 210°-220° C. until the acid value became 20 or less. 0.5 g of hydroquinone was then added to the reaction mixture and the mixture was placed on a stainless steel tray to cool. The unsaturated alkyd (E) thus obtained was a crystallized white wax-like resin having a melting point of 105° C.

Proparation of Paint Material (F)

Components as disclosed in the following Table 5 were kneaded in a kneading mixer heated to 105°-110° C. and the kneaded product was cooled to room temperature. The product was then powdered in a ball mill to prepare powdery paint (F) capable of passing through a 200 mesh shieve.

Table 5

|  | parts by weight |
|---|---|
| unsaturated alkyd (E) | 100 |
| triallylidene sorbitol | 20 |
| fumed silica | 20 |
| dicumyl peroxide | 3 |
| copolymer of 93 mols of ethylene and 7 mols of methacrylic acid | 5 |
| pigment (phthalocyanine green) | appropriate amount |

Table 5-continued

| | parts by weight |
|---|---|
| titanium white | appropriate amount |

This powdery paint (F) was placed on a steel plate to be painted to a thickness of 0.2 mm and the powdery paint layer was baked at 150°–160° C. for 30 minutes. The surface of the paint thus obtained had a very beautiful gloss and the surface hardness was 5 H. According to the DuPont Impact Test, the paint surface passed 1 kg-30 cm and the result of the Cross Cut Adhesion Test was 100/100. These results prove that the paint of this invention has excellent adhesive properties.

The paint surface was then subjected to a weatherometer for 500 hours. The paint surface thus treated passed 1 kg-30 cm (DuPont Impact Test). Although the result of Cross Cut Adhesion Test was 90/100, there was no change in the gloss and color tone of the treated paint surface.

A paint surface obtained by using powdery paint comprising the same components as disclosed in the above Table 5 except for omitting triallylidene sorbitol produced cracks after curing.

EXAMPLE 4

Preparation of Unsaturated Alkyd (G)

1480 g of phthalic anhydride and 980 g of maleic anhydride were charged in a five liter stainless steel reactor equipped with a stirrer, thermometer, reflux condenser and inlet tube for gas, and then 1300 g of propylene oxide was charged into the reactor together with inert gas for two hours while raising the temperature in the reactor to 180°–190° C. After charging propylene oxide, the temperature was raised to 200°–205° C. and the pressure in the reactor was reduced to 10 mm Hg for 30 minutes, and brown unsaturated alkyd having an acid value of 29.4 and a melting point of about 55° C. was obtained.

0.3 g of hydroquinone was then added to the unsaturated alkyd thus obtained and the mixture was placed on a stainless steel tray to cool. Thus, unsaturated alkyd resin (G) was obtained.

Preparation of Unsaturated Cycloacetal-Urethane (H)

870 g of tolylene diisocyanate mixture was charged in a two liter four-necked flask and 950 g of monoallylidene trimethylolpropane (purity = about 90%, manufactured by Nihon Kayaku K. K.,

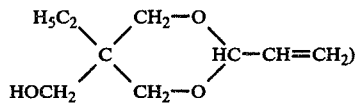

was then added dropwise to tolylene diisocyanate at 60°–70° C. After finishing the addition of monoallylidene trimethylolpropane, the resultant mixture was stirred for 24 hours at the same temperature. According to infrared analysis, free hydroxyl groups almost completely disappeared. The unsaturated cycloacetal-urethane (H) thus obtained was light brown syrupy and is expected to have the following chemical formula:

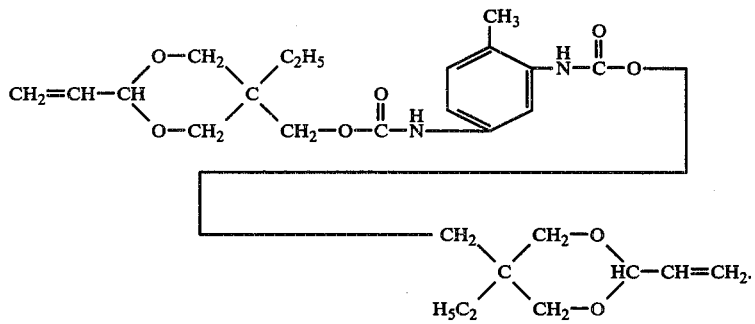

Components as disclosed in the following Table 6 were kneaded in a kneading mixer and the kneaded mixture was coated on a plain-woven glass cloth heated to 60°–70° C.

Table 6

| | parts by weight |
|---|---|
| unsaturated alkyd (G) | 100 |
| unsaturated cycloacetal-urethane (H) | 100 |
| hydrated alumina | 200 |
| fumed silica | 100 |
| dicumyl peroxide | 10 |
| zinc stearate | 20 |

The cooled prepreg thus obtained was soft but not sticky, and the storage stability was very good.

The prepreg was then cut into a piece of 30 × 30 cm, and the piece was molded at 160°–170° C. for 30 minutes under pressure of 30 kg/cm$^2$ to obtain a laminate.

Various physical properties of the laminate were measured and the results are shown in the following Table 7. It is clear from these results that this material is suitable for electrical use.

Table 7

| | |
|---|---|
| insulation resistance (ohm) | $10^{15}$ |
| dielectric strength (kV/mm) | 16 – 17 |
| bending strength (kg/mm$^2$) | 27.8 |
| Charpy impact strength (kg-cm/cm$^2$) | 50 or more |
| arc resistance (second) | 191 |
| anti-tracking properties (IEC Method CTI) | 600V, 51 drops or more |

What is claimed is:

1. A curable resinous composition which consists of (I) 100 parts by weight of unsaturated alkyd obtained by the condensation reaction of an α,β-unsaturated polycarboxylic acid or its anhydride with polyhydric alcohol or alkylene oxide, (II) 1–200 parts by weight of an unsaturated cycloacetal cross-linking agent obtained by the condensation reaction of an unsaturated aldehyde with a polyhydric alcohol and (III) a catalytic amount of an organic peroxide curing catalyst.

2. A curable resinous composition according to claim 1 wherein said α-β-unsaturated polycarboxylic acid or its anhydride is modified with a saturated polycarboxylic acid or its anhydride.

3. A curable resinous composition according to claim 1 wherein said α-β unsaturated polycarboxylic acid or its anhydride is selected from the group consisting of maleic acid, maleic anhydride, fumaric acid, itaconic acid and itaconic anhydride.

4. A curable resinous composition according to claim 1 wherein said polyhydric alcohol used to prepare said unsaturated alkyd (I) is selected from the group consisting of ethylene glycol, propylene glycol, 1,3-butanediol, 1,4-butanediol, neopentyl glycol, 2,2,4-trimethylpentanediol-1,3,-1,6-hexanediol, dibromoneopentyl glycol, hydrogenated bisphenol A, the addition product of bisphenol A with propylene oxide or ethylene oxide, diethylene glycol, dipropylene glycol, 1,2,3-trihydroxypropane, trimethylolpropane and pentaerythritol.

5. A curable resinous composition according to claim 1 wherein said unsaturated cycloacetal (II) is selected from the group consisting of diallylidene pentaerythritol, triallylidene sorbitol, monoallylidene and trimethylolpropane and monoallylidene trimethylolethane.

6. A curable resinous composition according to claim 2 wherein said saturated polycarboxylic acid or its anhydride used to modify the α-β-unsaturated polycarboxylic acid or its anhydride is selected from the group consisting of phthalic anhydride, isophthalic acid, terephthalic acid and its ester, succinic acid, adipic acid, azelaic acid, sebacic acid, hexahydrophthalic anhydride, tetrachlorophthalic anhydride, tetrabromophthalic anhydride, trimellitic anhydride, pyromellitic anhydride, tetrahydrophthalic anhydride, endomethylenetetrahydrophthalic anhydride and chlorendic acid.

7. A curable resinous composition according to claim 1 wherein said organic peroxide curing catalyst is selected from the group consisting of bis(4-t-butyl cyclohexyl)-peroxy-dicarbonate, benzoyl peroxide, t-butyl perbenzoate, t-butyl hydroperoxide, dicumyl peroxide, 2,5-dimethyl-2,5-di(t-butyl peroxy)hexane, and 1,1-di-t-butylperoxy-3,3,5-trimethyl cyclohexane.

* * * * *